United States Patent
Vuffray

[15] 3,652,884
[45] Mar. 28, 1972

[54] ELECTRIC MOTOR FOR WATCHES

[72] Inventor: Georges C. Vuffray, La Chaux-de-Fonds, Switzerland

[73] Assignee: Girard-Perregaux S.A., La Chaux-de-Fonds, Canton of Neuchatel, Switzerland

[22] Filed: Oct. 12, 1970

[21] Appl. No.: 79,753

[30] Foreign Application Priority Data

Oct. 13, 1969 Switzerland ..........................15381/69
Apr. 10, 1970 Switzerland ............................5353/70

[52] U.S. Cl. ..............................310/156, 310/218, 310/257, 58/23
[51] Int. Cl. ........................................................H02k 21/12
[58] Field of Search ............310/40 MM, 216, 257, 179, 180, 310/218, 254, 258, 156, 42, 43, 83, 194; 58/23

[56] References Cited

UNITED STATES PATENTS

| | | | |
|---|---|---|---|
| 2,499,326 | 2/1950 | O'Brien | 310/194 |
| 2,903,610 | 9/1959 | Bessiere | 310/254 |
| 2,999,176 | 9/1961 | Lindstrom et al. | 310/43 X |
| 3,076,110 | 1/1963 | Larson et al. | 310/194 |
| 3,241,397 | 3/1966 | Wilkinson | 310/40 MM X |
| 3,327,146 | 6/1967 | Morrill | 310/216 |
| 3,383,534 | 5/1968 | Ebbs | 310/179 X |

*Primary Examiner*—D. F. Duggan
*Attorney*—Stevens, Davis, Miller & Mosher

[57] ABSTRACT

The present invention concerns an electric motor for watches, composed of a rotor with permanent magnetization, a stator winding without core and with even spirals which presents a symmetrical plane parallel to the spirals and containing the axle of the rotor, a winding support made of nonmagnetic material and an annular yoke made of a ferromagnetic material with high permeability and low remanence surrounding the support.

14 Claims, 7 Drawing Figures

PATENTED MAR 28 1972 3,652,884

ELECTRIC MOTOR FOR WATCHES

The purpose of the invention is to provide a motor of minimum size with the highest possible degree of efficiency and which is capable of operating under the effect of surges of current sent into the stator winding.

To achieve this purpose, the motor in accordance with the invention is characterized by the fact that said yoke has at least one pair of openings diametrically opposed made in an annular area which extends to the level of the motor, the central axis of these openings being oblique with respect to the magnetic axis of the winding.

A particular form of design of this motor can be used to drive the hands of a small quartz clock. The motor comprises a unit generally cylindrical in appearance which can be designed in a manner completely independent of the other elements of the watch and is intended for being attached to an appropriate place in the frame of the watch. In this form of design the bearings are connected to two support elements of a round shape assembled coaxially one against the other and adjusted with respect to one another by means of a cylindrical yoke made of ferromagnetic material.

However, in certain preferred forms of design the motor according to the invention is supposed to be housed inside of the movement of an electronic wrist watch, for example a wrist watch of quartz crystal.

It is known that in order to achieve this purpose it is necessary not only to reduce the size of the motor but also to prevent any mechanical loss since the power source is composed of one or just a few miniature batteries and it is important to reduce power consumption in order to assure long life of the batteries. It is therefore necessary that there be a high degree of mechanical efficiency, in other words that the loss through rubbing in the clockwork be as small as possible and consequently that the mechanical operating conditions of the watch-train be optimum. Now in order to do this it is essential that the distances between the axes of the various watch-train elements be held at the smallest possible tolerances.

In such forms of design the bearings of the rotor are interlocked with two elements of the frame connected to one another and the winding support is held in place between said frame elements by appropriate centering elements offered by the frame elements and the winding support.

The attached sketch shows, by way of example, several forms of design of the motor according to the invention.

Figure 1:
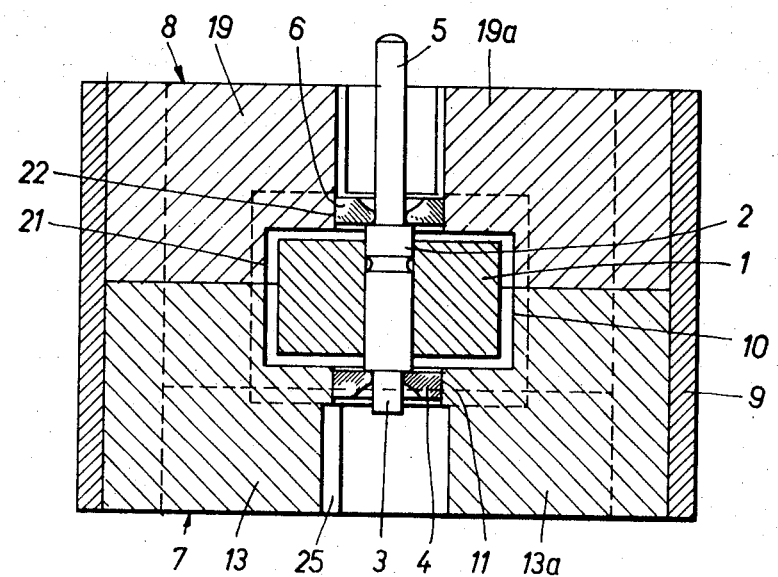
FIG. 1 is a sectional view of a first embodiment according to a plane perpendicular to the magnetic axis of the stator winding.

The rotor 1 of the motor in FIG. 1 is a cylindrical piece made of ferromagnetic material with a high degree of remanence magnetized according to a diametrical plane. This piece is mounted on a shaft 2 which has at its lower extremity, in FIG. 1, a pivot 3 inserted into a bearing 4 comprised of a clockwork stone and at its upper extremity an extended pivot 5 which passes through a second bearing 6 formed as is the bearing 4. The pivot 5 extends to the outside of the motor where it accepts a pinion or other driving mechanism.

Figure 3:
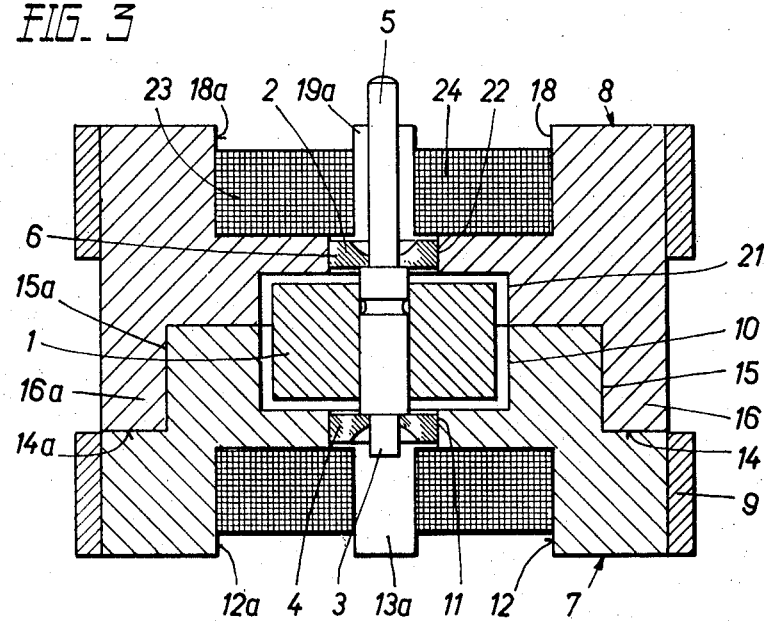
FIG. 3 is a sectional view according to a plane containing the magnetic axis of the stator winding.
Figure 4:
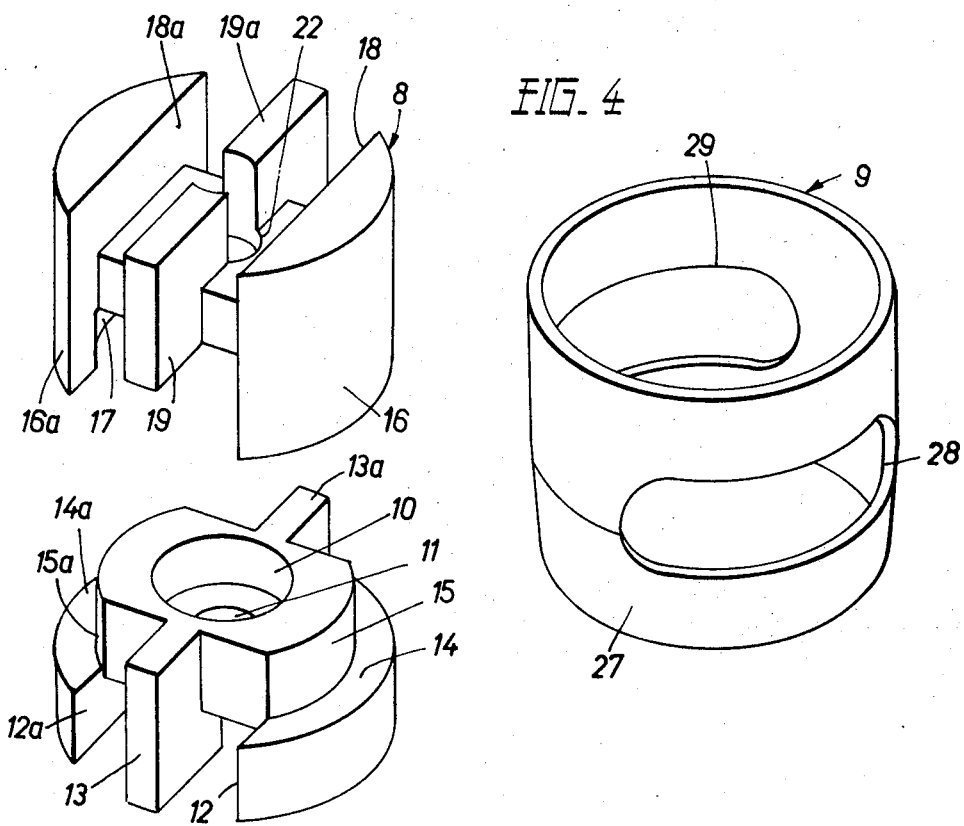
FIG 4 is a blown-up view of the three pieces comprising the body of the motor.

The bearings 4 and 6 are connected with the body of the motor which itself is composed of three pieces, a seating 7, a lid 8 and a yoke, or sleeve 9. They can be of a plastic material and formed by injection with the bearings, in which case the stones 4 and 6 are done away with or are of a non-magnetic metal. In the latter case they can be made by machining. The seating 7 is a piece of a generally cylindrical shape which has in its upper front side a cylindrical housing 10 the bottom of which is pierced by a central opening 11. In its lower side and in its external side there are grooves 12 and 12a (FIG. 4) which are parallel and arranged symmetrically on both sides of a diametrical plane. Between these grooves there are two diametrically opposed web elements 13 and 13a. Furthermore, the remaining part of the external side has shoulders 14 and 14a and elements of cylindrical spans 15 and 15a. The lid 8 has a similar structure, with the exception of the fact that in place of the shoulders 14, 14a and the lateral spans 15 and 15a there are diametrically-opposed protruding elements 16 and 16a presenting concave inside surfaces 17 adjusted to the spans 15 and 15a so as to permit the fitting of the lid 8 onto the seating 7 in a position which is coaxial with respect to the latter. The cylindrical housing 21 (FIG. 3) provided in the lower surface of the piece 8 forms with the housing 10 a cylindrical chamber the dimensions of which are slightly larger than those of the rotor 1 and which is intended for holding it, the central opening 11 of the piece 7 and the corresponding opening of the piece 8 being equipped, each one of them, with one of the bearings 4 and 6. When the two pieces 7 and 8 are assembled the grooves 12 and 12a, as well as the corresponding grooves 18 and 18a of the piece 8, form continuous passages of an annular shape in which the two parallel bodies 23 and 24 of the stator winding are wound. The spirals of this winding are thus contained in parallel planes perpendicular to the magnetic axis of the winding. The entire winding presents, furthermore, a diametrical symmetrical plane parallel to the plane of the spirals and extending in the direction of the webs 13, 13a of the seating 7 and in the direction of the corresponding webs 19, 19a of the lid 8.

Figure 2:
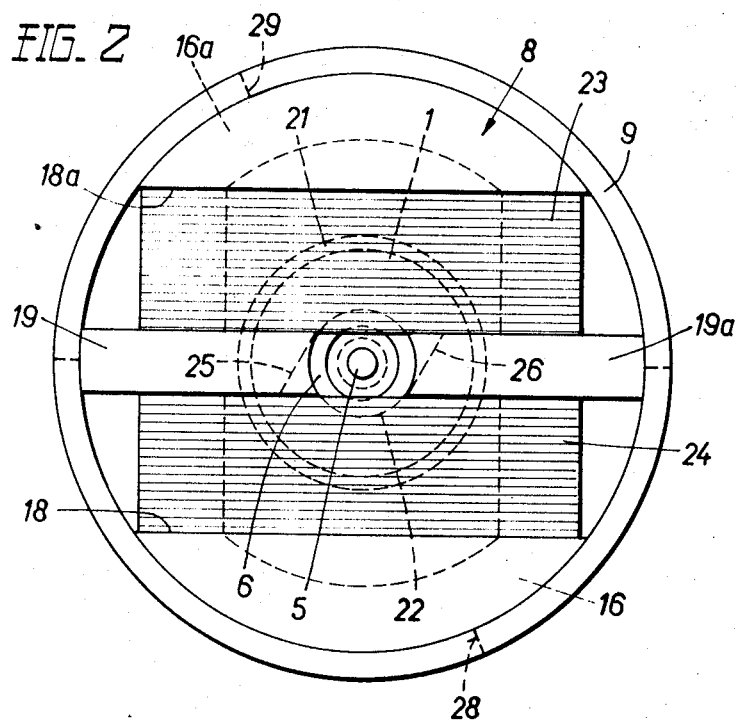
FIG. 2 is an overhead view.

It can be seen from FIG. 2 that the inside extremities of the webs 13 and 13a are cut in bezel according to the lines 25 and 26. This arrangement provides between the two grooves of the body of the motor a passageway for the winding wire during the subsequent winding of the two bodies of coils.

The yoke, or sleeve 9 is made of ferromagnetic material of low remanence and high permeability. It can be of Armco iron and produced by machining, moulding, laminating or else by calcing. It is of a cylindrical tubular shape and its inside surface is adjusted to the outside diameter of the pieces 7 and 8. This ring serves to close the magnetic circuit of the motor and protect it from the external fields to which it might be subjected.

In order to facilitate the mounting it is possible, for example, to impart to the outside surface a slightly conical shape and to adjust the inside surface with a slightly more marked tightening in the upper part than in the lower part. The ring 9 can thus be expelled easily onto the body shaped by the junction of the pieces 7 and 8. However, as will be seen further on, it is also possible to adjust the ring 9 so that it rotates freely on the body of the motor.

The sleeve 9 has two diametrically opposed openings 28 and 29 each one of which extends in length onto an arc of a circle of approximately 120°. Their width is equal to about one-third of the total height of the ring, that is to say one-third of the height of the motor and, as can be seen from FIG. 3, this width of the openings 28 and 29 is approximately equal to the axial length of the rotor 1. The two extremities of each opening are rounded out in a semicircle while the central parts of the edges of the openings extend in planes perpendicular to the axis of the rotor. In driving the ring 9 onto the body of the motor it is oriented so that one of the extremities of each opening falls into the axis defined by the webs 13, 13a, 19, 19a resulting in the other extremity of the openings being oriented to about 30° with respect to the magnetic axis of the winding while the central axis of the full parts existing between the openings is oriented by 60° with respect to the magnetic axis. In other forms of design the length of the openings could be different. It could be reduced to approximately 60°. It was found, however, that optimum efficiency is obtained with the dimensions indicated above.

The motor which has been described is meant to be controlled by surges of current and to turn step by step. In the absence of current the magnetic axis of the rotor shifts spontaneously into a direction perpendicular to the central axis of the openings 28 and 29. It is, in effect, in this position that the magnetic circuit passing through the rotor and the sleeve 9 is the shortest. With the arrangement represented in FIG. 2 and with the motor stopped in the preferred position defined above, if a surge of current is sent into the stator winding such that it imparts a torque on the rotor making it turn in the direction of the hands of the watch this current surge will drive the rotor to the point where its magnetic axis is parallel to the magnetic axis of the winding. After the surge of current has stopped, the torque of magnetic recoil onto the rotor will make it turn to a position which is diametrically opposed to that which it had in the beginning. If the second surge which is sent into the stator winding is of the opposite polarity of that of the first surge then the rotor will effect a second half-turn in the same direction as the first one. The sending of surges of current of alternate polarity at regular intervals of time into the stator winding therefore causes an irregular movement of rotation of 180° by the rotor 1.

Although this form of operation of the motor is a particularly advantageous one, it is obvious that the rotor described can also be drive in continuous rotation. To do this the surges of current must be sufficiently close in order to prevent any stoppage in the rest positions determined by the openings of the ring 9. Furthermore, the movement can also be an oscillating movement. This will be the case if the surges of current sent into the stator winding are of the same polarity. The rotor will oscillate between the direction defined by the central axis of the full parts of the ring and the magnetic axis of the winding. It is to be noted in particular that such an oscillation can occur in the case of the operation first described if the polarity of the surge of current sent into the stator winding is such that the torque experienced by the rotor tends to make it turn in the opposite direction of the hands of the watch. The rotor will rotate a maximum of 30° in this direction and then will return to its initial position and the next surge of current will drive it into the desired direction. It is also seen that it suffices to make the ring 9 turn by an angle of 60° with respect to the body of the motor in the opposite direction of the hands of the watch in order for the motor to turn in the opposite direction under the same conditions as above.

The moving part mounted on the extremity of the shaft 2 can be a pinion driving a clockwork which itself comprises moving parts for seconds, minutes and hours carrying the corresponding indicator hands into an electronic watch, for example a quartz watch or small clock. The frequency of the surges can be, for example, 1 second, the motor then turning by jerks at a speed of 30 revolutions per minute.

In another form of design it is also possible to mount on the pivot 5 an element carrying a catch working together with a ratchet-wheel so as to drive it in step-by-step rotation.

Figure 5:
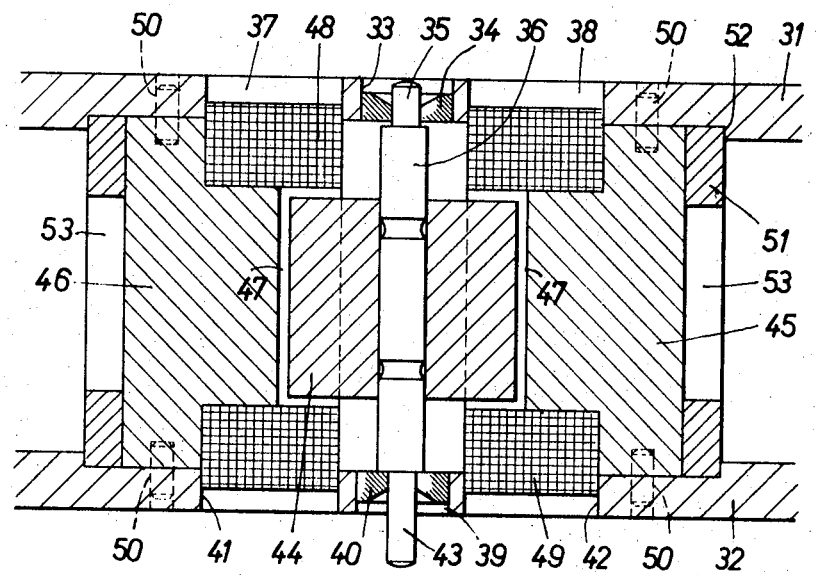
FIG. 5 is a sectional view of the second embodiment.
Figure 6:
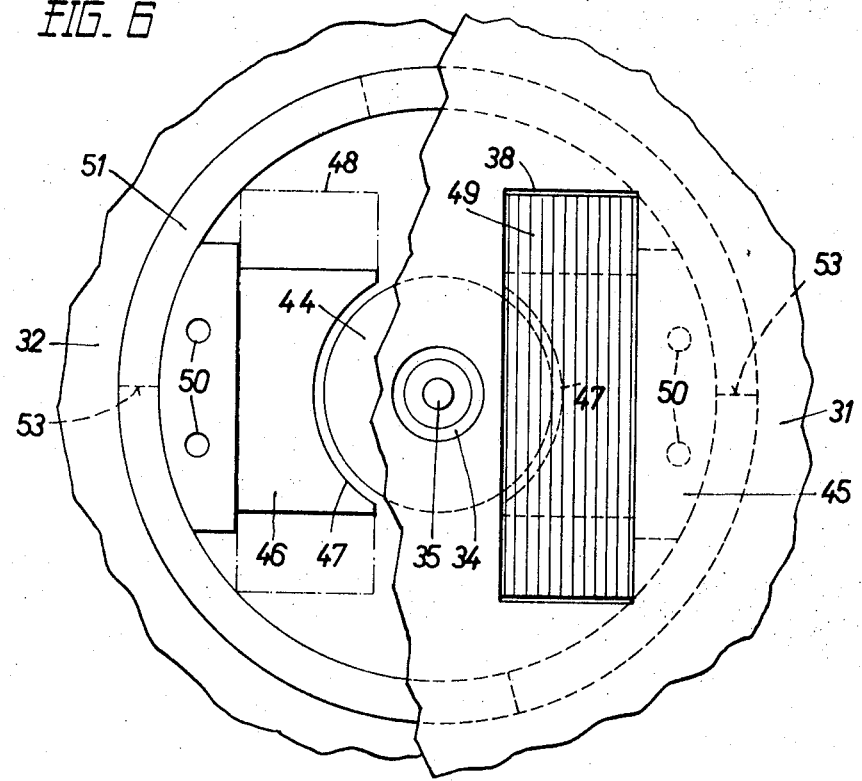
FIG. 6 is a cut away view from overhead of this second embodiment.

The motor represented in FIGS. 5 and 6 is incorporated in the movement of a wrist watch containing a quartz crystal as the essential element of its time cycle base. The power source composed or one or two miniature batteries providing a voltage of 1.2 volt maintains the oscillations of the time cycle and feeds a frequency divider whose output supplies surges of alternating polarity at a frequency of 0.5 Hz. These surges drive the stator winding of the motor and make it turn at a mean rate of rotation of 30 revolutions per minute by step of 180°. In its turn this motor drives a speed-reducing gear train which activates the hands of the watch. All of the elements of the movement are housed between a mounting plate 31 and one or more bridges including, among others, a clockwork bridge 32. Some of these elements can also be arranged on the outside surfaces of the mounting plate or of the bridges. At the site of the motor the mounting plate has an opening 33 into which a stone 34 is driven which forms the bearing in which the pivot 35 of the shaft 36 turns. On both sides of this opening the mounting plate has two more rectangular openings 37 and 38 the purpose of which shall be described further on.

The bridge 32 is attached to the mounting plate 31 by the conventional means such as guides or a screw, for example. It has a round opening 39 coaxial to the opening 33 and into which there is driven a stone constituting the other bearing of the shaft 36. On both sides of this opening 39 there are pierced two rectangular openings 41 and 42 which correspond to the openings 37 and 38, respectively. The stone 36 is passed through by a pivot 43 offered by the shaft 36 at its extremity on the bridge side and this pivot, of a length greater than that of pivot 35, protrudes at the outside of the bridge 32 so as to accept a pinion (not shown). This pinion can be driven onto the tip of the shaft 43 after the mounting of the movement, as shall be seen later on.

The rotor has a permanent magnet 44 cylindrical in shape which is driven onto the central part of the shaft 36. The latter is made of steel, while the permanent magnet is made of a material with a strong coercive field and a high maximum BH, for example anisotropic ferrite, platinum-cobalt alloy, samarium-cobalt alloy, or another magnetic material of high performance. The permanent magnet of the rotor is magnetized diametrically.

The winding support is formed by two coil elements 45 and 46 similar in shape and arranged symmetrically on both sides of the rotor. As can be seen in FIG. 5, each one of these coil elements comprise a solid part the height of which corresponds to the distance between the mounting plate 31 and the bridge 32 and a protruding part which extends opposite to the permanent magnet 44 which is somewhat higher than the axial length of this part of the rotor and which surrounds it partially. Each coil support 45, 46 presents opposite the cylindrical surface of the rotor a surface 47 which which constitutes a portion of cylindrical surface coaxial to the rotor. The protruding part of the coil elements serves as a support for each one of the coils 48, 49. The latter are wound separately onto each coil element in the form of even spirals. Lastly, in the case represented each coil has a rectangular section. Preferably the coil elements 45 and 46 will be made of an injected plastic material, for example plexiglas, polyvinylchloride, teflon, material with a glass fiber base, ceramic material, etc. The shape of these coils is relatively simple and they can thus also be obtained by machining. Each coil element has, in the upper surface and in the lower surface, two recessed holes into which fixing bases 50 are driven which serve for positioning the coil supports at the time of the mounting.

Lastly, the motor comprises a yoke, or sleeve 51 composed of a piece of tubular shape made of a ferromagnetic material of high permeability and low remanence which surrounds the coil elements 45 and 46. This ring is placed into a round groove 52 cut in the inside surface of the mounting plate. As in the first form of design, it has openings 53 intended for assuring the orientation of the rotor in the absence of a surge of current in the stator coils.

The differement elements of the motor can be manufactured independently of one another. To mount the motor onto the mounting plate 31 it suffices to take the two coil elements 45 and 46, fit them onto the permanent magnet of the rotor so that the coil heads pass above and below the flat front sides of this magnet and engage the pivot 35 of the rotor into the bearing 34 at the same time as the coil elements are put into place by engaging the bases 50 into the corresponding holes of the mounting plate. Once this operation has been accomplished the ring 51 can be placed in the appropriate position after which the bridge 32 is put into place as in the case of a conventional bridge of mechanical movement by engaging the pivot 34 into the stone 40 and the fixing bases 50 into the openings provided for this purpose in the bridge 32. At that time there is nothing further to do than to connect the extremities of the coils 48 and 49 to the electronic divide which provides distribution of the surges and to place a pinion on the edge of the shaft 43. In this operation it could be useful to hold up the stone which forms the lower bearing in order to prevent it from being driven out. One of the ends of each coil is connected to a common connecting point so as to assure a connection in series of the two coils and the other end is connected to the rest of the distributor.

In this form of design, since the bridge 32 can also carry the bearings of at least part of the motor reduction unit which drives the hands, the distance between axes of the first stage of this gear train is determined in production. This assures optimum efficiency. In effect, the hole 39 which accepts the bearing of the motor's rotor and the hole (not shown) which accepts the bearing of the second moving part of this gear are cut out and honed over again simultaneously into the bridge 32 so that the closest tolerance levels can be maintained. Since the holes for the fixing bases 50 can also be honed during the same operation, it can be seen that optimum precision is achieved in the positioning of the different parts of the motor.

Another advantage of the design described is that the bearings of the motor are easily accessible and that the hopping about of the rotor can be regulated by conventional means by adjusting the position of the stones 34 and 40. Regulation of the oil can also be done more easily during the course of the operation.

Lastly, the design described provides for minimum bulkiness, particularly a construction of the smallest possible height. In effect, the sides of the spirals of the windings pass immediately above the front surfaces of the rotor.

Figure 7:
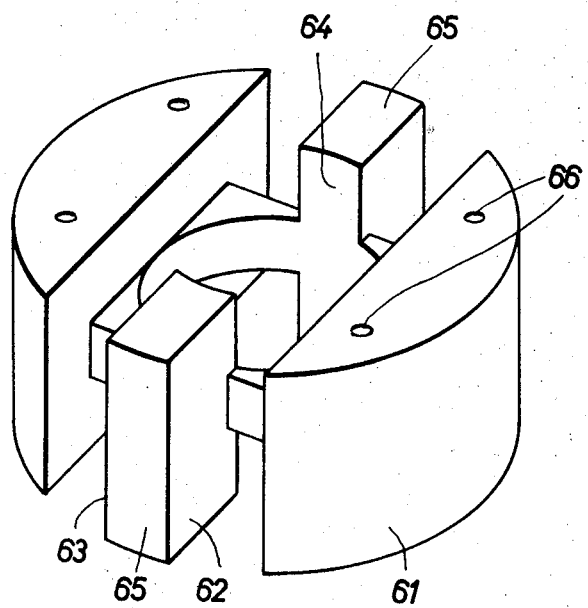
FIG. 7 is a drawing in perspective of a design variation of the winding support.

Lastly, FIG. 7 shows a design variant of the winding support. This element which replaces the coil elements 45 and 46 of the figure can also be obtained by moulding or injection of plastic material, for example plexiglas, by calcing or by machining in a metallic mass. It is composed of a non-magnetic material and presents the general shape of a cylindrical body 61 into which are arranged two annular grooves 62 and 63 and a axial piercing 64. Each one of the two grooves 62 and 63 extend along two generatrices and two cords in the side surface and in the front surfaces of the element 61. They are symmetrical with respect to a diametrical plane. As regards the piercing, it is done coaxially to the element 61 and has a diameter slightly greater than the diameter of the rotor. This coil support permits a design which is a combination of that of FIGS. 1 and 5. The rotor is engaged in the passage 64 prior to effecting the winding. After that the spirals of the coils are wound into the grooves 62 and 63, the rotor being held in place so that later it is trapped between the two windings. The central webs 65 assure the guiding of the winding. The element 61, wound and provided with a sleeve similar to the sleeve 51, is placed between the mounting plate and the bridge of the clockwork movement, the pivots of the shaft engaging in the bearings which are carried by these two frame elements.

The seatings 66 placed in the front surfaces of the element 61 are also intended for accepting fixing pins and centering pins similar to the pins 50.

In this variation the coils can be completely immersed in the grooves 62 and 63. It is therefore not necessary to provide in the mounting plate and in the bridge of the motor openings corresponding to the openings 37, 38, 41, 42 of FIGS. 5 and 6 and the winding is housed entirely between the inside surfaces of the frame elements.

I claim:

1. An electric motor for a watch, comprising: a permanently magnetized rotor; a stator having spiral windings defining a symmetrical plane substantially parallel to the axis of said rotor; a non-magnetic winding support; and an annular yoke of ferromagnetic material having high permeability and low remanence surrounding said support, said yoke including means having an axis of magnetization lying in a plane generally perpendicular to the axis of said yoke, said axis of magnetization being oblique with respect to the magnetic axis of said stator.

2. A motor according to claim 14, wherein said yoke comprises at least one pair of diametrically opposed openings extending to the level of said rotor, the central axis of said openings being oblique with respect to the magnetic axis of said stator.

3. A motor according to claim 14, characterized in that the yoke has a circular cylindrical shape and has two elongated openings both extending over an arc of a circle between 60° and 120°.

4. A motor according to claim 2, wherein said openings have a central axis inclined towards the magnetic axis of the stator winding by an angle of approximately 30°.

5. A motor according to claim 2, characterized in that the stretched out form of said openings is that of a rectangle with extremities in a semicircle, the width of the rectangle being set at least approximately equal to the axial length of the rotor.

6. A motor according to claim 2, characterized in that the support is of a generally cylindrical shape, engaged in the yoke, and has two parallel annular grooves in its outside faces, said stator winding being distributed into two wound elements each one in one of said grooves.

7. A motor according to claim 5, characterized in that the winding support is composed of two elements attached coaxially one to the other, of a generally cylindrical form, defining between them a central cylindrical housing containing the rotor and being equipped with two coaxial bearings immersed in the opposite front surfaces of said housing.

8. A motor according to claim 6, characterized in that said coaxial support elements are made of a plastic material containing a charge of molybdenum bisulphide said bearings being manufactured with said elements.

9. A motor according to claim 5, characterized in that said yoke is mounted around the support so that it can be displaced rotatably so as to reverse the direction of rotation of the motor.

10. A motor according to claim 5, characterized in that the bearings of the rotor are interlocked with two elements of the frame of the movement of the watch connected to one another and in that the winding support is held in place between said frame elements by appropriate centering elements offered by the frame elements and the support.

11. A motor according to claim 9, characterized in that the winding support is composed of two independent coil elements, each element carrying a coil.

12. A motor according to claim 9 for a wrist watch, characterized in that said frame elements are the mounting plate and a movement bridge.

13. A motor according to claim 9, characterized in that the centering elements are composed of bases engaged in corresponding forms of the frame elements and of the winding support.

14. A motor according to claim 9, characterized in that the shaft of the rotor passes through one of the bearings and carries a pinion situated on the outside surface of the corresponding frame element.

* * * * *

UNITED STATES PATENT OFFICE
CERTIFICATE OF CORRECTION

Patent No. 3,652,884　　　　Dated March 28, 1972

Inventor(s) Georges C. VUFFRAY

It is certified that error appears in the above-identified patent and that said Letters Patent are hereby corrected as shown below:

Claims 2 and 3 depend on Claim -- 1 -- instead of Claim "14".

Signed and sealed this 22nd day of August 1972.

(SEAL)
Attest:

EDWARD M. FLETCHER, JR.　　　　ROBERT GOTTSCHALK
Attesting Officer　　　　　　　　Commissioner of Patents